H. G. LORD.
TORSIONAL EQUALIZER FOR TRANSMISSION OF POWER.
APPLICATION FILED JAN. 11, 1917.
1,240,065. Patented Sept. 11, 1917.
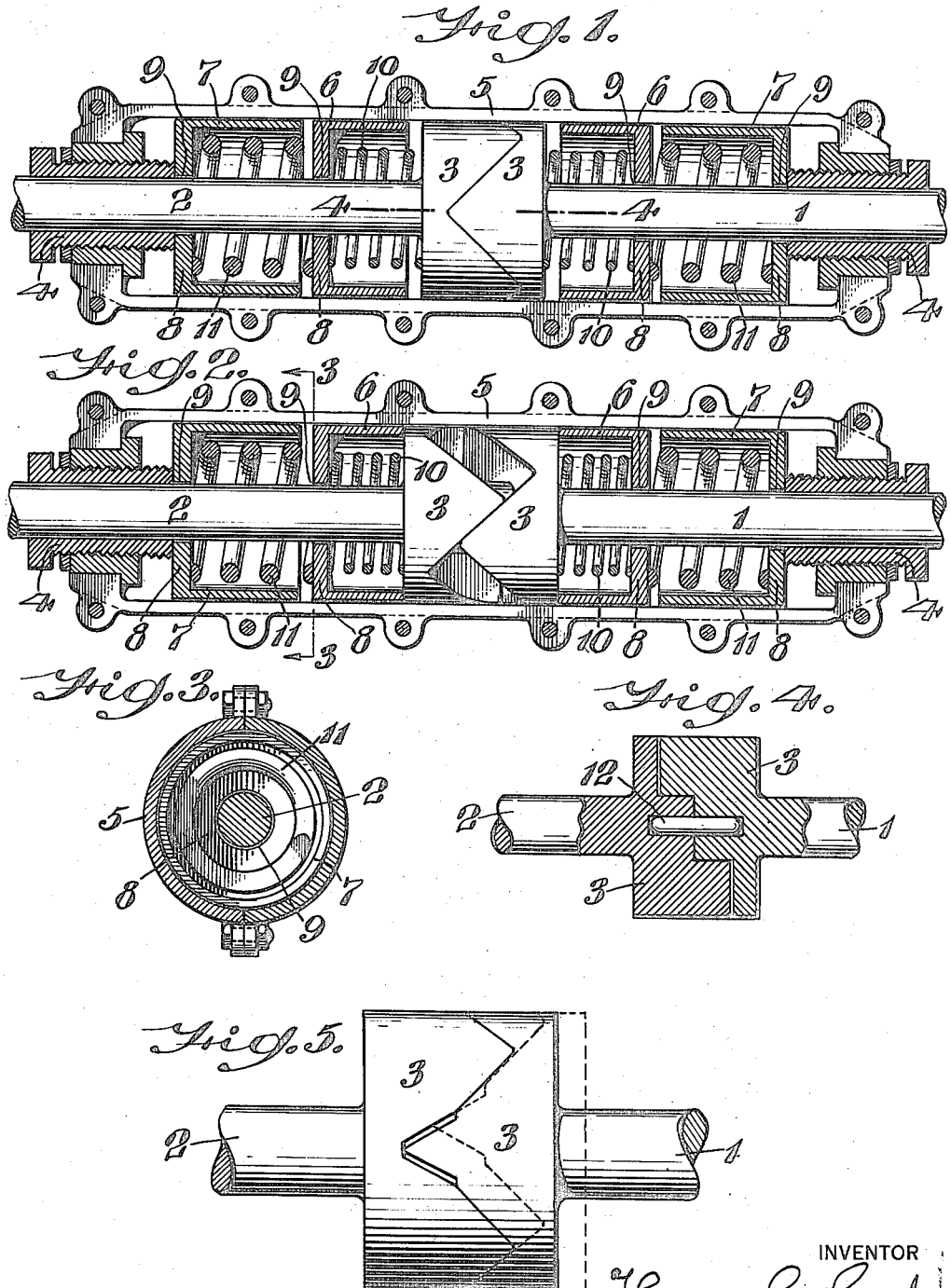

UNITED STATES PATENT OFFICE.

HARRY G. LORD, OF PHILADELPHIA, PENNSYLVANIA.

TORSIONAL EQUALIZER FOR TRANSMISSION OF POWER.

1,240,065.  Specification of Letters Patent.  Patented Sept. 11, 1917.

Application filed January 11, 1917. Serial No. 141,801.

*To all whom it may concern:*

Be it known that I, HARRY G. LORD, a citizen of the United States, residing in the city and county of Philadelphia, State of Pennsylvania, have invented a new and useful Torsional Equalizer for Transmission of Power, of which the following is a specification.

My invention relates to a new and useful reciprocal device for the accomplishment of torsional resilience in the transmission of power, thus compensating abrupt fluctuations in either power or load.

A familiar example of such fluctuation, harmful in results, is found in the operation of the internal combustion engine, particularly in conjunction with its use as the motive power of auto vehicles. Another instance may be cited in the operation of electric vehicles by storage battery, especially vehicles of the truck type.

For the purpose of illustration and description, my invention is shown in application to the drive shaft of an automobile, where its function would be to compensate, or tend to absorb vibrations and the violence of fluctuation of the successive power impulses of an internal combustion engine, or the initial power impulse of an electric motor. While the invention is thus shown in connection with, and virtually a part of the drive shaft of an automobile as stated, it is to be understood that it may be applied in principle, and in appropriate form, at any point in the line of power transmission between the engine, or motor, and the wheels of the vehicle by which traction is secured.

Furthermore, while the invention is satisfactorily illustrated in the accompanying drawing, the important instrumentalities thereof may be varied. It is therefore to be understood, that the invention is not to be limited to the specific details shown and described.

The invention consists primarily of two heads, or blocks, circular in form, having angular, or toothed faces freely interfitting each with the other. In the present application of the device, these heads are contained within a suitable case or housing, the latter serving the purposes of preserving the alinement of the divided portions of the drive shaft, which shaft is formed of sections; serving as a container for a suitable lubricating material; and indirectly, as a stop for preventing the total disengagement of the toothed or angular faced heads. This case or housing as well as all other parts of the device revolves freely with the driving and driven sections of the drive shaft.

Figure 1 represents a longitudinal section of a drive shaft in normal condition embodying my invention.

Fig. 2 represents a similar section showing the position of the parts during the relative movement of the angular faced heads.

Fig. 3 represents a transverse section on line 3—3 Fig. 2.

Fig. 4 represents a longitudinal section of a portion on line 4—4 Fig. 1.

Fig. 5 represents a side elevation showing another embodiment of the invention.

Similar numerals of reference indicate corresponding parts in the figures. Referring to the drawings, 1 and 2 designate sections of a drive shaft, say of an automobile or motor vehicle, the section 1 being the driving member adapted to be operated from any suitable power, and the section 2 being the driven member adapted to operate the wheels of said vehicle, through the medium of suitable mechanical connections.

The inner end of each section is connected with a head 3 having toothed faces, the face of one head being adapted to interfit freely with the face of the opposite head, said heads being contained freely in the case or housing 5 in whose ends are the adjustable male and female bushings 4, 4, the male member of which receives freely the outer portions of the shaft sections 1 and 2 and allow the same to move therein in opposite directions, and the female members of which are fitted in the ends of the housing.

In said casing are two sets of caps 6 and 7 each set being intermediate of the respective head 3, and the end of the bushing 4, said caps having each in what may be called its bottom or back wall 8 the opening 9 to allow the shaft sections to pass therethrough.

Within the caps 6 are the springs 10, and within the caps 7 are the springs 11, which are adapted to hold the heads 3 in close engagement, said springs surrounding the shaft sections and resting against the walls 8, 9 of said caps, the springs 10, however, bearing against the backs of the heads 3, while the springs 11 bear against the walls 8 of the caps 6, it being noticed that the springs 10 and 11 are of different expansive pressure or resistance to compression.

When the shaft sections are running under normal conditions the heads 3 are interlocked as one, and remain so, see Fig. 1, so long as the driven member is subjected to no unusual or sudden strain, or load, or the driving member is subjected to no sudden or excessive power impulse.

In the centers of the inner faces of the toothed portions of the heads 3 are openings which freely receive the pin or dowel 12 which is of such length as to hold said heads in alinement regardless of their relative movements.

In Fig. 1 the angular toothed faces are in close engagement as they would appear at absolute rest; when operating at moderate or high speed under light load and with a rapid succession of power impulses; and also in the intervals between slower and heavier power impulses, and under heavy load.

Each of the embodied springs is held in a separate cup or retaining case, all of the said cups or retaining cases being separate from the outer case or housing. Of these said cups or retaining cases, the two outer, or farthest away from the heads, or angular toothed faces, are held immovable longitudinally by spring pressure from the front or open ends, and by screw pressure of a threaded adjusting sleeve bearing against the rear, or closed ends. The two inner cups, or those nearest the heads or angular toothed faces move longitudinally between a stop formed by backward contact with the rear, or outer cups, and a stop formed by forward contact with the back of the angular faced, or toothed heads.

In Fig. 2, the heads or angular toothed faces are in altered relation, each to the other, such alteration consisting both of longitudinal and of circumferential movement, and being the result of heavy or sudden torsional force exerted by the driving upon the driven head or angular toothed face. A continued increase of power applied by the driving to the driven head, or an unusually violent fluctuation of said power, or the occurrence of both conditions simultaneously would cause a further longitudinal and circumferential movement of the heads, or angular toothed faces, with relation to each other, to a predetermined point or points. At the said predetermined point or points, the heads or angular toothed faces would have moved longitudinally to contact with the open end of the first, or nearest adjoining cup, or spring retaining case; would have moved said cup longitudinally to contact with the open end of the next adjoining cup, or spring retaining case, which said cup or spring retaining case being held immovable longitudinally, acts as a positive stop preventing the entire disengagement of the heads or angular toothed faces, and rendering the actuation of the driven by the driving head finally positive, yet primarily resilient under the stress of violent fluctuations of power.

In operation, the above described movements of the heads or angular toothed faces, and their reciprocation of said movements, said reciprocation being actuated by the reaction of the springs embodied, serve to equalize or compensate fluctuations of power, and to actually store and restore power, which power would otherwise result in injury to connected mechanism if transmitted by a non-resilient medium.

It is to be understood that the heads 3 may embody teeth or faces, interfitting each with the other, of such angle or angles relative to the line of diameter of the said heads, as may tend to effect the desired degree of resilience, resistance or reciprocation, or any combination of angles for the purpose of effecting the said features of resilience, resistance and reciprocation, as a result of the functioning of said heads.

In Fig. 5 is shown an example in principle of heads 3 embodying a plurality of angles, or angles differing in degree with each other and with relation to the line of diameter of the said heads, such different angles occurring as shown, in the individual teeth forming the interfitting faces of the heads. It is obvious that as a result of such variation of angle or plurality of angles being embodied in the individual teeth forming the interfitting faces of the heads, the movement of said heads, longitudinal and circumferential, will be relatively changed, thus effecting a variable degree of resistance of the driven to the driving head, depending upon the angles employed.

To explain more fully the operation of heads 3 embodying differing angles as shown in Fig. 5. In this instance, the interfitting teeth or faces each embody two angles, differing in degree, which engage successively during the functioning of the said heads. Thus, when at rest, and also during the first portion of the relative movement of said heads, the only parts thereof in direct engagement or contact, each with the other, would be that portion of the teeth or faces having the lesser of the two embodied angles, say 45 degrees with relation to the line of diameter. The relative movement of the heads 3 continuing to a point intermediate of the total possible extent thereof, say approximately one-half of two-thirds of said possible movement, the second, or next succeeding embodied angles, of say, 60 degrees with relation to the line of diameter, come into engagement or bearing and so remain during the remainder of the relative movement of the heads, thereby increasing the resistance of the driven to the circumferential force exerted by the driving head.

It is to be understood that the foregoing references to movements of the toothed or angular faces heads and associated parts refer solely to their movements with relation to each other, and not to the revolutions, or rotary motion of the entire device with its containing case or housing moving as a unit.

Having thus described my invention what I claim as new and desire to secure by Letters Patent, is:—

1. A shaft formed of sections, angular toothed heads on the opposite inner ends or faces thereof, a housing in which said sections are freely mounted, caps in said housing, springs in said caps, said springs being of different expansive pressure adapted to be compressed successively on the thrust of said heads due to the outward movements thereof.

2. A shaft formed of sections, angular toothed heads on the opposite inner ends or faces thereof, a housing in which said sections are freely mounted, caps in said housing, springs in said caps, said springs being of different expansive pressure, the springs of less pressure being adapted to be compressed primarily by said heads, and the springs of greater pressure being adapted to be compressed successively by the caps which contain the springs of less pressure.

3. A shaft formed of sections, angular toothed heads on opposite inner ends or faces thereof, a housing in which said sections and heads are freely mounted, and springs within said housing adapted to be compressed successively on the thrust of said heads due to the outward movements thereof, said springs being of different expansive pressure.

4. The combination of two shaft sections; coacting toothed heads on the adjacent ends of said sections; a housing surrounding the heads; a cap in the housing; a spring operative on the cap for pressing together the two faces of said heads; and adjustable means for restricting the relative longitudinal movement of the heads to an amount less than the height of the teeth, including two concentric sleeves of which one engages the housing and the other engages the cap.

5. A shaft formed of sections, angular toothed heads on the opposite inner ends or faces thereof, a housing in which said sections are freely mounted, caps in said housing, a threaded sleeve concentric with the shaft sections adapted to restrict the longitudinal movement of said caps within said housing, whereby the said toothed heads are held in continuous engagement.

6. A shaft formed of sections, angular toothed heads on the opposite inner ends or faces thereof, a housing in which said heads are freely mounted, caps in said housing, said caps being restricted in longitudinal movement by means of adjustment adapted for manipulation externally as regards said housing, said heads being restricted in relative longitudinal and circumferential movement by said caps, and male and female threaded bushings respectively on the housing and divided shafts.

7. A shaft formed of sections, angular toothed heads on the opposite inner faces thereof embodying on said heads angles of differing degree, which said angles coming into engagement successively, effect a change in the ratio of the longitudinal and circumferential movements of the said heads, thereby necessitating a different stress or force to actuate or cause a relative movement of said heads, depending on the degree of angles so employed.

8. A member for transmitting power, formed of sections; angular toothed heads on adjacent faces of said sections; and springs of different resilience adapted to be compressed successively by the thrust of said heads due to their relative longitudinal movement.

9. A member for transmitting power formed of sections; angular toothed heads on adjacent faces of said sections; with springs operative on said heads and arranged to be compressed successively by the thrust of the heads due to their relative outward movement.

10. A member for the transmission of power, formed of sections; angular toothed heads on adjacent parts of said sections; a housing inclosing said heads; at least one spring operative to press the heads together; and at least one set of male and female threaded bushings operative respectively on the housing and on one of the sections.

11. The combination in a torsional equalizer of a member made in two sections; heads for said sections respectively having coacting toothed surfaces; at least one spring acting to maintain said heads in engagement; and means for limiting rotative movement of said sections to an amount less than the pitch of the teeth of the coacting surfaces of said heads.

12. The combination in a torsional equalizer of a member made in two sections; heads for said sections having coacting toothed surfaces; a plurality of springs acting to maintain said toothed surfaces in engagement; and means for limiting the relative rotative movement of the heads to an amount less than the pitch of the teeth thereof.

13. The combination in a torsional equalizer of a member including two sections; heads for said sections respectively having coacting toothed surfaces; a plurality of coaxial coil springs operative on one of said heads; and means for limiting relative rotative movement of the heads to an amount less than the pitch of the teeth thereof.

14. The combination in a torsional equalizer of a member including two sections; heads for said sections having coacting toothed surfaces; at least two coaxial coil springs operative on each of said heads; and means for limiting relative rotative movement of the heads to an amount less than the pitch of the teeth thereof.

15. The combination in a torsional equalizer of two shafts; heads for said shafts respectively having coacting toothed surfaces; at least one spring acting to maintain said heads in engagement; a housing; and a structure between the housing and at least one of the heads for limiting its movement away from the other head to an amount less than the height of the coacting teeth on said heads.

16. The combination in a torsional equalizer of two shafts; heads for said shafts having coacting toothed surfaces; a housing; springs in said housing operative to press the heads together; and caps for the springs formed to act between the heads and the housing to prevent complete disengagement of the teeth on one head from those of the other.

HARRY G. LORD.

Witnesses:
JOHN A. WIEDERSHEIM,
N. BUSSINGER.